UNITED STATES PATENT OFFICE.

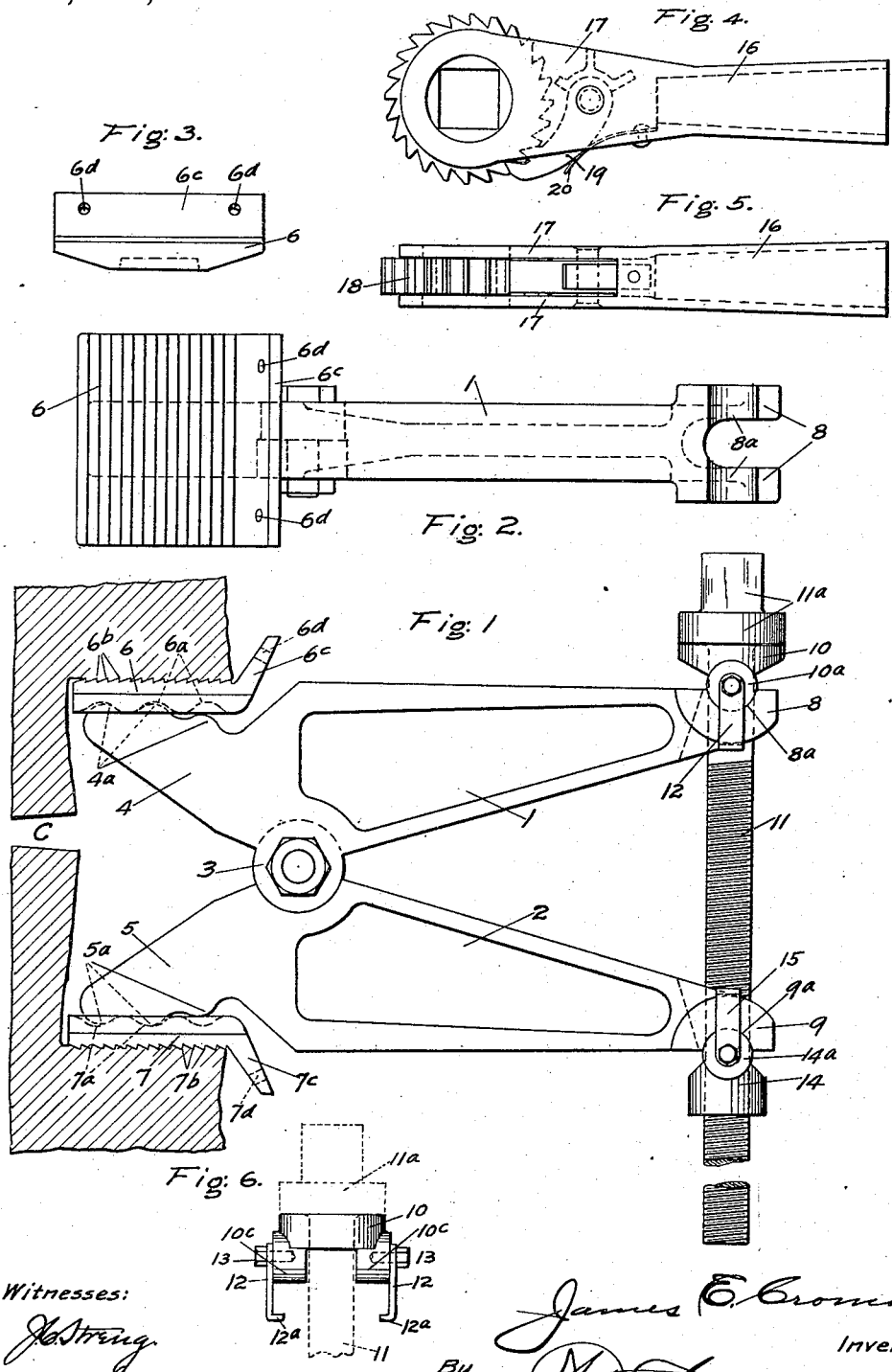

JAMES E. CROMAN, OF PORTLAND, OREGON, ASSIGNOR TO TREE FALLER & CUTTER COMPANY, A CORPORATION OF OREGON.

TREE-FELLING DEVICE.

1,211,414.   Specification of Letters Patent.   Patented Jan. 9, 1917.

Application filed May 15, 1916. Serial No. 97,699.

*To all whom it may concern:*

Be it known that I, JAMES E. CROMAN, a citizen of the United States, residing in the city of Portland, county of Multnomah, and State of Oregon, have invented certain new and useful Improvements in Tree-Felling Devices, of which the following is a specification.

My invention relates to tree felling devices of the character shown and described in my pending application, filed September 15, 1913, Serial Number 789,795, and it has as its salient object to provide certain improvements to overcome objections and defects which have been discovered in connection with the development of my said invention.

In the invention as shown and described in my above-referred-to application, the jaw members operate directly in contact with the tree, that is, in the cut made in the side of the tree to receive the tree felling device. I have found by actual experience that frequently the tree is not hard enough, or may have defective spots so that the jaw members sink into the wood and fail to operate in the manner desired. In order to overcome this, I have conceived the idea of using supplemental jaw plates which are inserted in the notch cut in the side of the tree, and have formed the jaw members of my device so that they operate directly upon these supplemental jaw plates. I have also improved the power screw mechanism by means of which the lever members of my device are brought together.

In order that others may understand my invention more clearly, I have illustrated one practical embodiment thereof in the accompanying sheet of drawings which I will now describe.

Figure 1 is a side elevation of my invention in use, a fragmentary portion of a tree only being shown; Fig. 2 is a top plan view of the device showing the upper jaw plate in place; Fig. 3 is an end view of the upper jaw plate looking at it from the left hand side of Fig. 2; Figs. 4 and 5 are side and edge views, respectively, of an operating ratchet wrench, for operating the power screw of the device; and Fig. 6 is a rear view looking at the upper end of the power screw and its mounting, as seen in Fig. 1.

Referring now more in detail to the drawings, 1 and 2 designate two power levers hingedly connected, as at 3, so as to rock one upon the other, in a manner clearly indicated in Fig. 1, said levers being provided at one end with jaws 4 and 5, the outer, or opposite faces of which are of corrugated form, as at $4^a$ and $5^a$.

6 and 7 designate upper and lower jaw plates, provided upon their jaw engaging faces with corresponding sockets, or seats, as $6^a$ and $7^a$, adapted to receive the ridge portions $4^a$ and $5^a$, of the jaw members, as clearly indicated. Said jaw plates are provided on their tree engaging faces with notches or teeth, as $6^b$ and $7^b$. Said jaw plates are also provided with flange portions $6^c$ and $7^c$, having nail holes $6^d$ and $7^d$, therein, which may be used, if desired, to hold the plates in place, while the jaws are being inserted, although this in most cases may not be necessary.

The levers 1 and 2, are provided at their opposite ends with U-shaped portions, as 8 and 9, shown in top plan view in Fig. 2. The U-shaped portion 8, has seats, $8^a$, formed in its upper side, the U-shaped portion 9, has corresponding seats, $9^a$, formed in its lower side. Pivotally seated in the seats $8^a$, is a nut-like member 10, having trunnion-like portions $10^a$, adapted to said seats, said nut-like member 10, having inserted therethrough a power screw 11 having a head with operating shank $11^a$, at its upper end. Retaining clips 12—12, are bolted to the opposite ends of the trunnion members $10^c$—$10^c$, by means of bolts 13—13, said retaining clips being provided with hooks $12^a$—$12^a$, adapted to hook under the lower edges of the sides of the U-shaped portion 8, of the lever 1, as clearly indicated in Figs. 1 and 6. A similar nut-like member 14, having the trunnion portions $14^a$, is seated in the seats $9^a$, in the bottom faces of the sides of the U-shaped member 9, of lever 2, as clearly indicated in Fig. 1, said nut-like member being held in place by means of holding clips 15, similar to the holding clips 12—12, and hooked over the top edges of the portion 9, as will be clear from Fig. 1. The nut-like member 14 is provided with screw, which, at its upper end turns freely in the nut-like member 10, in a manner which is clear from the drawing.

In Figs. 4 and 5, I have shown a ratchet wrench for operating said power screw, said ratchet wrench comprising the body 16, adapted to receive a lever of any suitable kind, and terminating at its operating end in two side members 17—17, between which is mounted a ratchet wheel 18, adapted to receive the shank 11ª, through suitable openings in the side members 17—17, as will be clear from Figs. 4 and 5. Mounted between said side members is an operating pawl, or dog, 19, held in engagement with said ratchet wheel 18, by means of a spring 20. It will be readily understood how this device operates the power screw 11.

The operation of my invention may be briefly described as follows: After a suitable notch has been cut in the side of the tree, the supplemental jaw plates 6 and 7, are placed therein, in the positions shown in Fig. 1, and the jaw members 4 and 5, are inserted, the notch being of such size as will receive the jaw members in their closed positions, that is, so that the ridges 4ª and 5ª, nearest the pivotal point of the levers 1 and 2, will be seated in the seats 6ª and 7ª, nearest the outer edge of the tree. As the power screw 11, is operated, to draw the outer ends of the lever members 1 and 2, together, the jaw members 4 and 5 move apart, and the second or middle ridge portions 4ª and 5ª, move into the middle seats 6ª and 7ª, of the plates 6 and 7, expanding the notch cut in the tree, and as said screw 11, is further operated, the innermost ends of the jaws 4 and 5, move into the innermost seats 6ª and 7ª, of the plates 6 and 7, until the jaws have been completely expanded. In the positions shown in Fig. 1, further closing of the outer ends of the levers 1 and 2, by the screw 11, will move the innermost ends of the jaws 4 and 5 into the innermost seats of the plates 6 and 7. This interfitting connection between the jaws 4 and 5, and the jaw plates 6 and 7, causes the whole device to move slightly inwardly as it is operated, in order that the engaging portions of the jaws may properly seat in the plates 6 and 7.

In Fig. 1, the fragmentary portion of the tree illustrates the tree in the act of being thrown over, C indicating the cut made by the saw, which operates between the jaw members 4 and 5, in a manner clearly understood and fully illustrated in my co-pending application above referred to.

I am aware that changes in the details of my invention as here illustrated can be made without departing from the spirit thereof, and I do not, therefore, limit the invention to the particular showing here made, except as I may be limited by the hereto appended claims.

I claim:

1. A tree felling device of the character referred to, comprising two pivotally connected power levers, bearing one upon the other in rocker-like relationship, a power screw operating at their outer ends for drawing said levers together, said levers being provided with operating jaws at their opposite ends, a pair of supplemental jaw plates adapted to be inserted in a notch cut in a tree to receive said jaws, and means for holding said jaws in operating engagement with said jaw plates.

2. A tree felling device of the character shown and described, comprising a pair of pivotally connected power levers bearing one upon the other in rocker-like relationship, a power screw operatively connecting the outer ends of said levers together and adapted to draw said outer ends toward each other, said levers being provided at their opposite ends with jaws, and a pair of jaw engaging plates adapted to be inserted in a notch cut in a tree, said plates and said jaw members having interfitting engagements therebetween, whereby to prevent slipping of said jaw members on said plates.

3. In a tree felling device of the character referred to, a pair of operating levers pivotally connected to each other, nut-like members pivotally seated in the outer ends of said levers, a power screw connecting the outer ends of said levers, through said nut-like members, said levers being provided at their opposite ends with jaws, supplemental jaw plates adapted to be inserted in a notch cut in a tree, the tree-engaging faces of said plates being provided with holding means to prevent slipping, and their inner or adjacent faces being adapted to have interfitting engagement with the engaging faces of said jaw members, which are adapted therefor, substantially as described.

4. A tree felling device of the character shown and described, comprising in combination, two pivotally connected power levers bearing one upon the other in rocker-like relationship, nut-like members pivotally and detachably seated in the outer ends of said levers, means for holding said nut-like members in their seats, a power screw connecting said nut-like members and having a threaded engagement with one of them, whereby to draw the outer ends of said levers together when said screw is operated, said levers being provided at their opposite ends with jaw portions, and a pair of supplemental jaw plates having interfitting operating connections with said jaw portions, said jaw plates being provided in their outermost faces with holding means, substantially as shown and described.

Signed at Portland, Multnomah county, Oregon, this 6th day of May, 1916.

JAMES E. CROMAN.

In presence of:
I. M. GRIFFIN,
R. B. FRENCH.

Copies of this patent may be obtained for five cents each, by addressing the "Commissioner of Patents, Washington, D. C."